United States Patent [19]
Bridger et al.

[11] Patent Number: 4,749,146
[45] Date of Patent: Jun. 7, 1988

[54] MAGNETIC TAPE DRIVES
[75] Inventors: Graham Bridger, Trowbridge; Warwick A. Higgins, Bridgewater, both of England
[73] Assignee: Thorn Emi Datatech Limited, Feltham, England
[21] Appl. No.: 938,453
[22] Filed: Dec. 5, 1986
[30] Foreign Application Priority Data
Dec. 7, 1985 [GB] United Kingdom ............... 8530217
[51] Int. Cl.⁴ .................. G11B 15/32; B65H 18/10; B65H 20/14
[52] U.S. Cl. .................. 242/195; 242/71.8; 226/91; 226/97
[58] Field of Search ............ 242/71.8, 195, 197–200, 242/182, 186, 201–203; 226/91, 92, 95, 97; 360/93, 96.1, 96.3, 132

[56] References Cited
U.S. PATENT DOCUMENTS 3,910,526 10/1975 Mosciatti ........................ 242/182
4,520,970 6/1985 Rasmussen et al. .............. 242/195
4,620,678 11/1986 Kumakara et al. ............... 242/195
4,626,950 12/1986 Livermore et al. .............. 242/72 R Primary Examiner—David Werner
Attorney, Agent, or Firm—Fleit, Jacobson, Cohn & Price

[57] ABSTRACT

An automatically threading magnetic tape drive includes a small-flanged take-up reel and a removeable large-flanged supply reel whose diameter is greater than the center-to-center spacing of the reels. During threading, a hinged shutter is closed to provide an air-tight barrier between the reels, the supply reel lies in a region of relatively high air pressure H and the take-up reel lies in a region of relatively low air pressure L. An air-tight channel links the region H and L and tape is threaded through the channel by air flow. Tape is drawn towards the take-up hub by air flow along slots in one or both take-up flanges, and the hub surface is elastomer-coated. During normal running the shutter is opened and tape spooled on to the take-up reel may overlap the supply reel flanges.

14 Claims, 6 Drawing Sheets

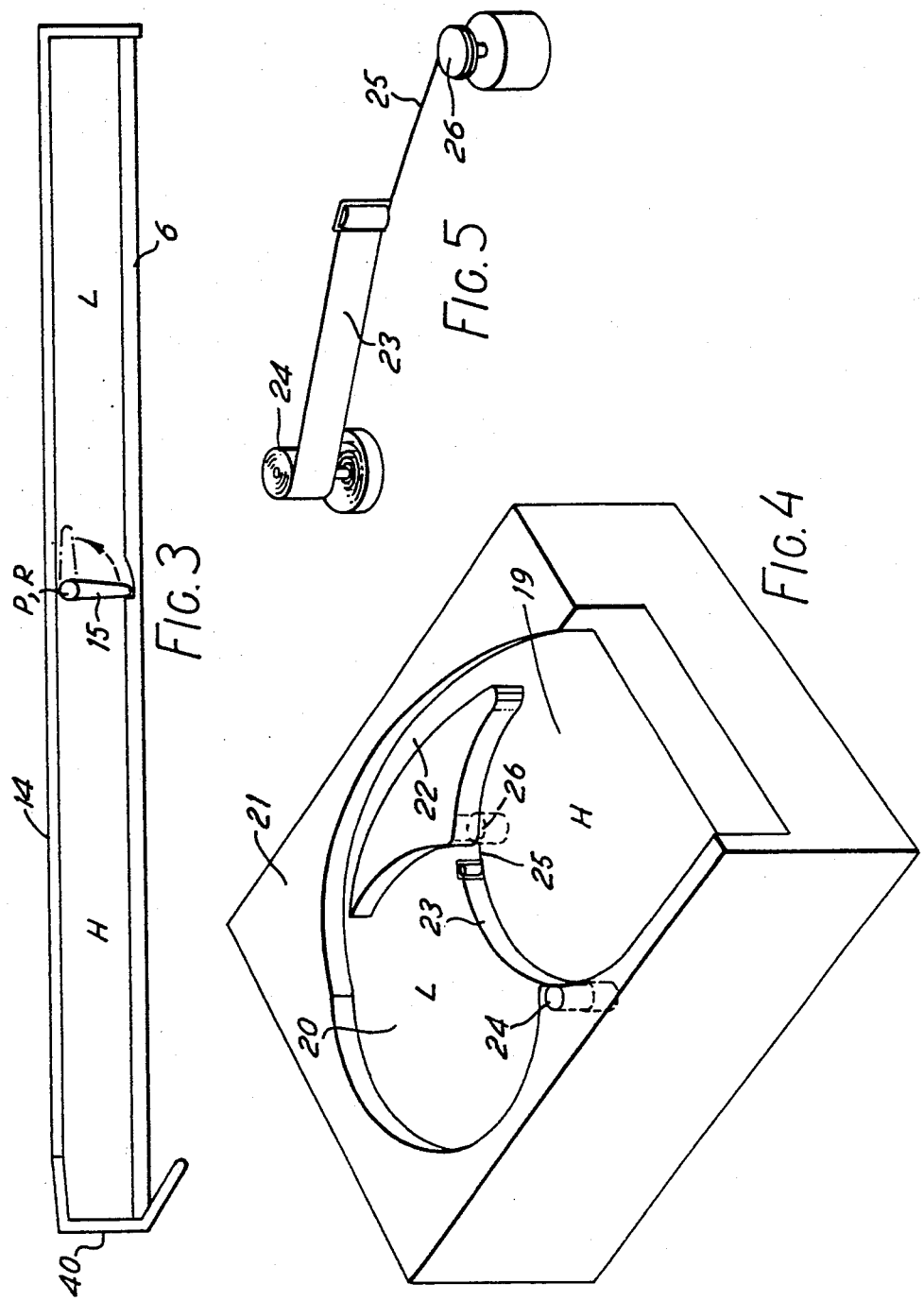

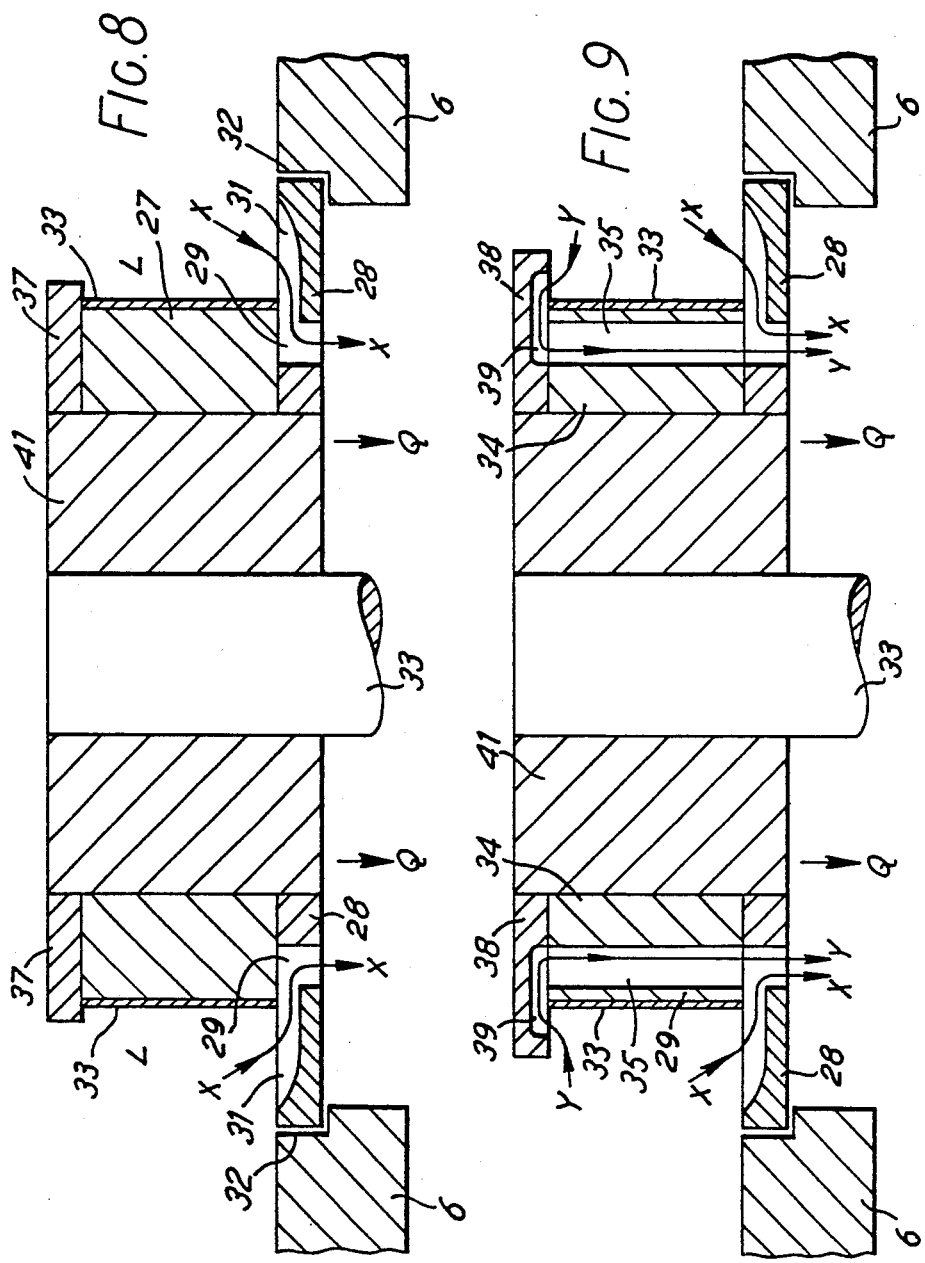

MAGNETIC TAPE DRIVES

The present invention relates to magnetic tape drives which utilise air pressure differentials to automatically thread the leading end of magnetic tape from a removeable supply reel through a channel containing the recording heads and on to a take-up reel. Examples of such drives have been described, for example, in British Pat. Nos. 987721 and 1141442 and in U.S. Pat. Nos. 3,393,878 and 4,243,186. In such arrangements, the take-up hub has been provided with a plurality of circular or slot shaped perforations through its peripheral wall which communicate with a source of relatively low air pressure, usually suction, while the supply spool periphery lies in an atmosphere of relatively high air pressure, typically atmospheric or higher. The channel, containing recording heads and suitable guides, is exposed at one end to the high pressure region and at the other end to the low pressure region and air flow carries the leading end of tape through the channel towards the take-up hub. Such arrangements, in general, operate satisfactorily and reliably when handling tape having comparatively thick base films, in the order of 35 to 50 micrometers thickness. When handling thinner tapes of 25 micrometer base film thickness and below, however, it has been found that the first few inner layers of tape may become physically distorted with a permanent impression of the take-up hub perforations. Such physical distortion can in use, cause head to tape separation loss and signal drop-out, these effects becoming more apparent at high linear recording densities, in the order of 1000 bits or wavelengths per mm and above. Furthermore, the physical distortion can penetrate further layers of spooled tape during a period of static storage on a perforated hub, and the effect may worsen with increased storage time.

A further physical distortion of the tape may be caused by the step, equal to the tape thickness, formed by the leading end of tape lying adjacent to the take-up hub peripheral surface. The inner layers of spooled tape may carry impressions of this step and give rise to a once per revolution periodic disturbance of the tape which may adversely affect recording or replay performance at high recording densities.

A further disadvantage with such prior arrrangements is that the tape drives, for satisfactory air flow through the channel, have been provided with a substantially air-tight fixed barrier between the high pressure and low pressure regions, requiring the supply and take-up reels to be widely spaced. It would be an advantage, particularly in tape drives handling large spools of, for example, 27 cm diameter or higher, such as 36 cm diameter, for the reels to be more closely spaced and thereby enable a more compact construction.

It is an object of the present invention to provide an improved magnetic tape drive in which the above mentioned disadvantages have been substantially overcome.

The invention will now be described, by way of example, with reference to the accompanying drawings in which:

FIG. 3 is a side view of a cover and a deck plate, showing a pivoted shutter,

Figure 6:
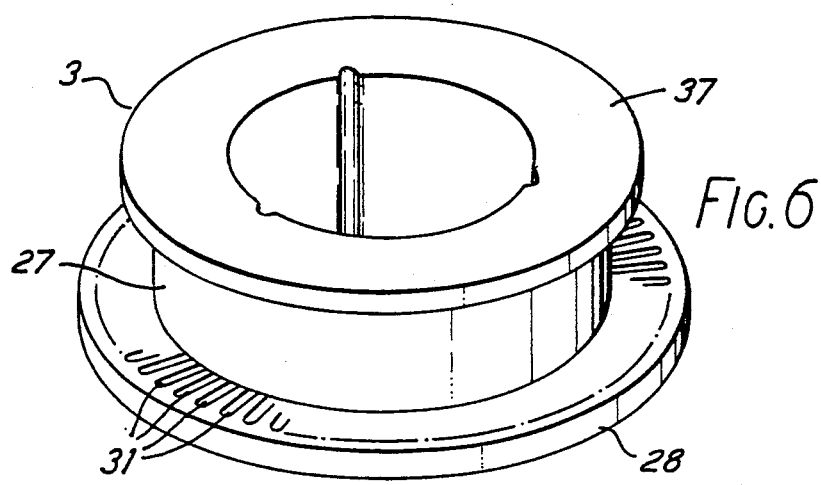
Figure 7:
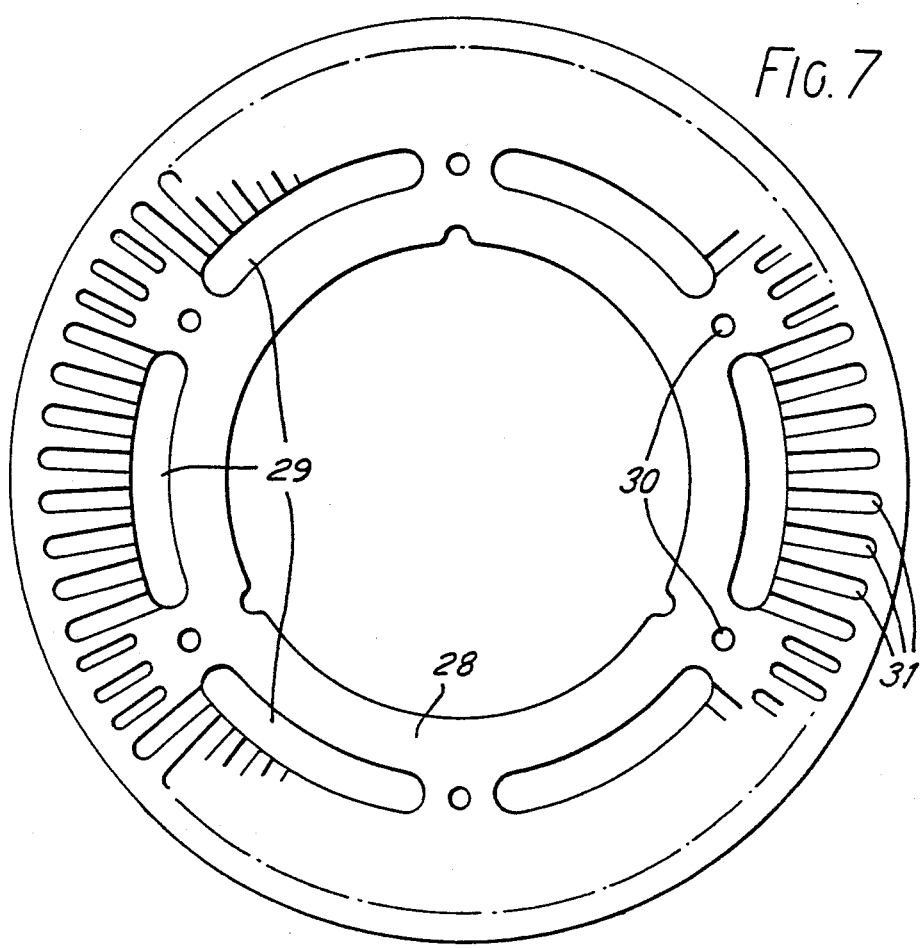
Figure 10:
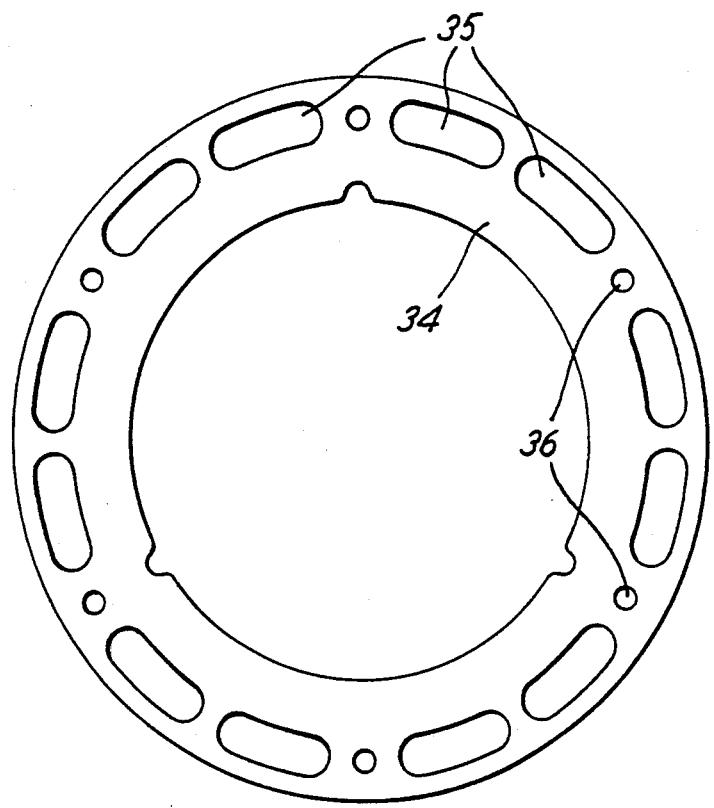

FIG. 4 is a perspective view a second embodiment of a deck plate, showing a flexible barrier, FIG. 5 illustrates the operation of the flexible barrier, FIG. 6 is a perspective view of a take-up reel, FIG. 7 is a plan view of a lower flange of a take-up reel, FIG. 8 is a diametric side sectional view of a take-up reel FIG. 9 is a diametric side sectional view of a second embodiment of a take-up reel, FIG. 10 is a plan view of a hub for use with the second embodiment of a take-up reel.

Figure 1:
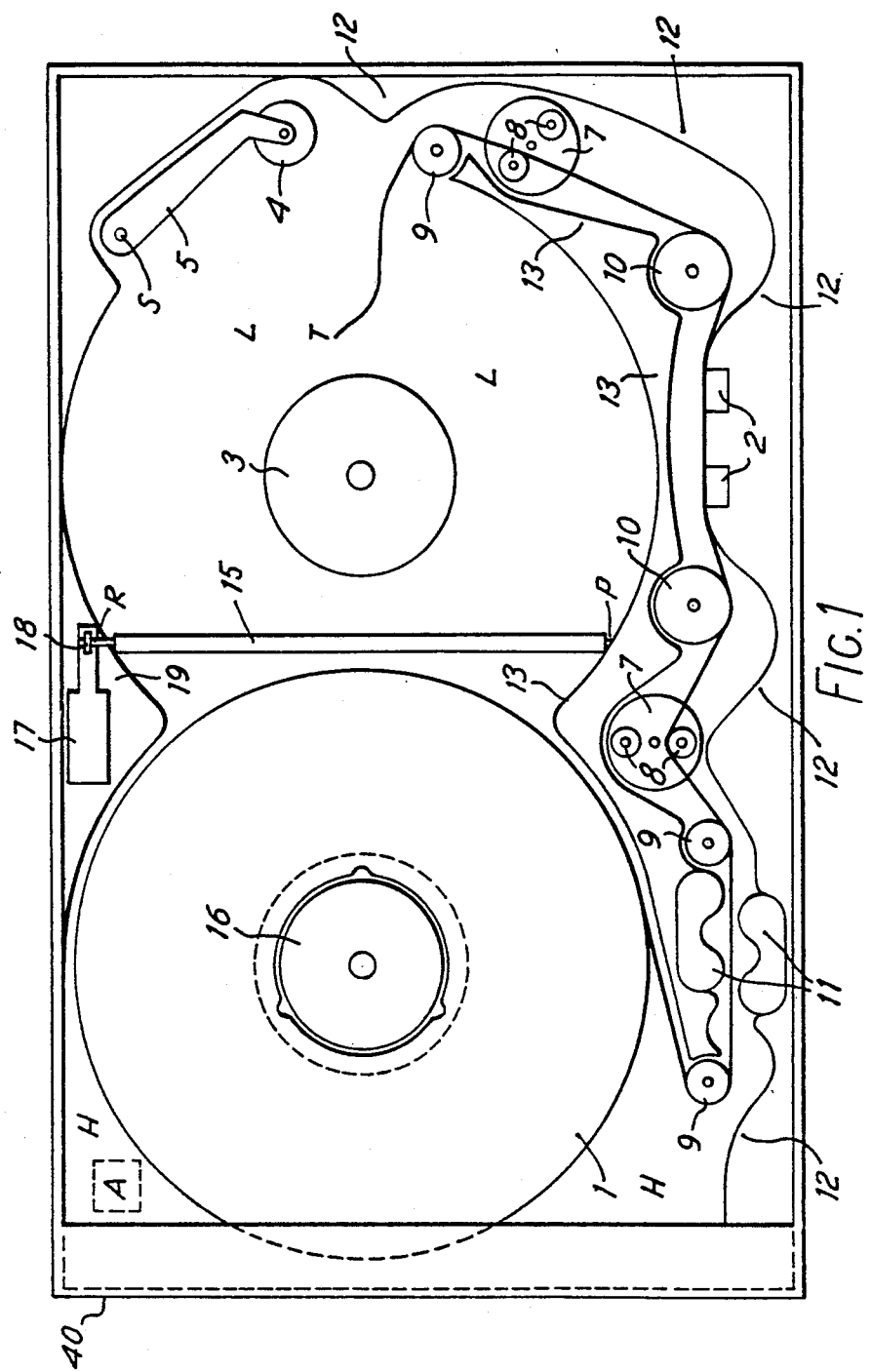
FIG. 1 is a plan view of a magnetic tape drive during a threading operation.

A plan view of a horizontal tape drive suitable for high density instrumentation recording is shown in FIG. 1 in which tape from a large flanged removeable supply reel 1 is driven over record and replay heads 2 on a take-up reel 3 having small flanges.

Figure 2:
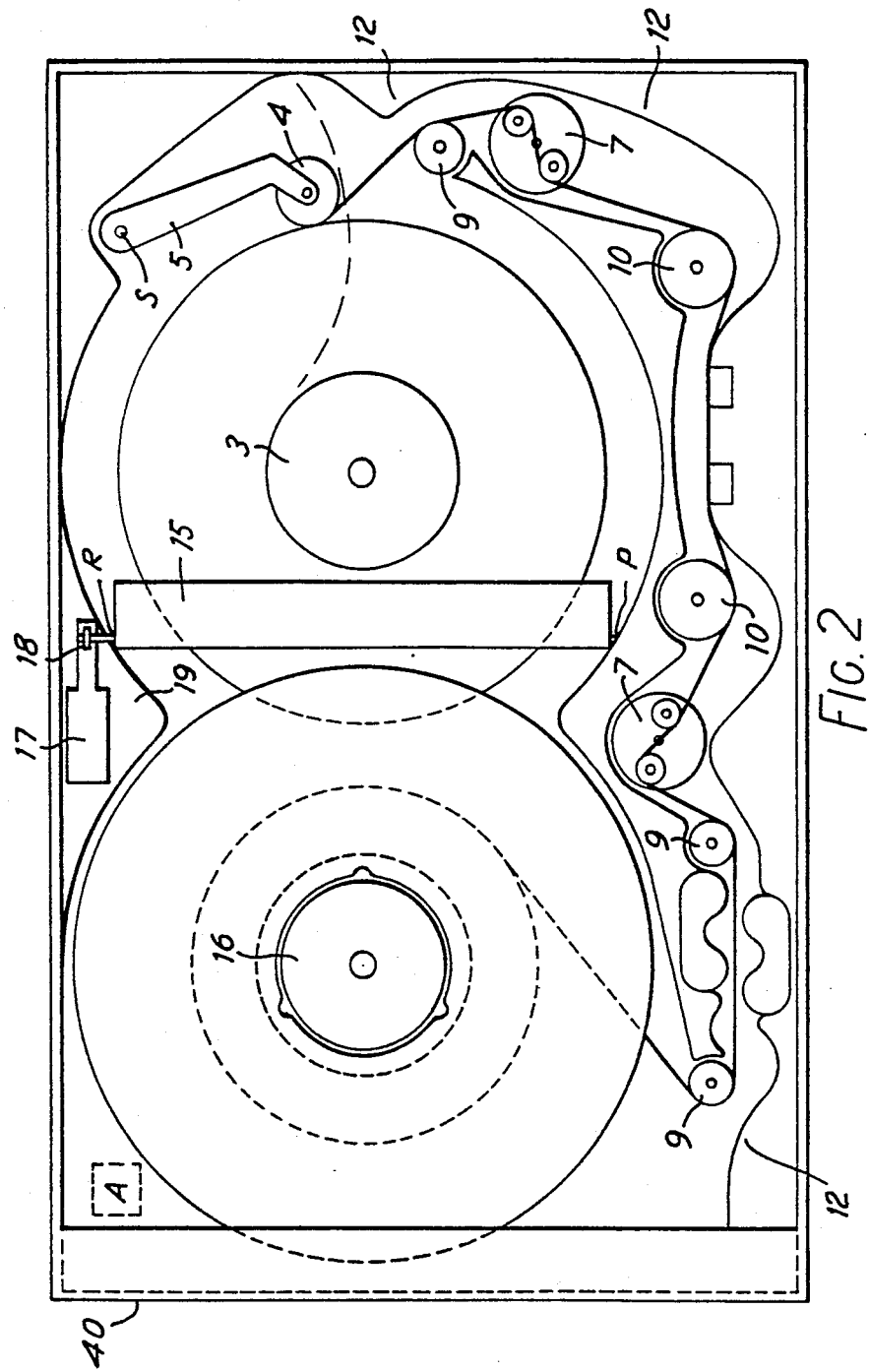
FIG. 2 is a plan view of the drive while running.

The use of small flanges on the take-up reel permits a compact construction in which tape spooled on the take-up reel may overhang the small flanges and, as the supply reel is emptied of tape the overhanging unsupported pack of tape on the take-up reel may freely pass between the flanges of the supply reel as is shown in FIG. 2. A pack following roller 4, which is assembled to an arm 5 pivoting about the point S, is in a retracted position during threading as shown in FIG. 1 and, during running, is urged by spring means towards the periphery of the spooled tape in order to provide guidance to the overhanging pack of tape. The pack following roller has small flanges which guide the tape, and both the roller 4 and the arm 5 are typically made of a lightweight aluminium alloy. The tape path includes two rotatable tensioners 7, each comprising a pair of rotatable guide pillars 8, three guide rollers 9 and a pair of differentially driven capstans 10. Optionally a tape cleaner comprising a pair of cartridges 11, each containing tape cleaning fabric, may be provided, the fabric being retractable to provide a clear path for tape threading.

Motors (not shown) are mounted beneath a deck plate 6 for driving the supply and take-up reels and the capstans, and for the servo control of the tensioners, and actuating means for suitably retracting the packing roller and tape cleaning fabric for tape threading are provided. The motors and actuating means are microprocessor controlled for automatic operation.

The tape drive is equipped with means for automatically threading the free end of tape from the supply reel along the tape path and on to the take-up reel in a manner which requires no perforations in the tape contact surface of the take up reel. The underside of the take-up reel is exposed to a source of relatively low pressure, and the periphery of the supply spool communicates in the region 'A' through perforations in the deck plate with a source of relatively high air pressure. A top cover 14 for the transport is provided. Raised portions 12, 13 on the deck plate provide walls to either side of the tape path which extend to the top cover to form a substantially air-tight channel and tape may be automatically threaded over the guide rollers, heads, capstans tensioners and, when fitted, between tape cleaning cartridges by drawing air through the channel. The sources of low and high pressure may conveniently be the inlet and outlet respectively of a fan (not shown) mounted beneath the deck plate which, when operating, causes the region H in the vicinity of the supply reel to be at high pressure and the region L in the vicinity of the take-up reel to be at low pressure. Referring also to FIG. 3, a rigid shutter 15 is pivotally mounted to either side of its upper edge at points P and R to wall portions 13 and 19 respectively of the deck plate, such that when in the vertical position, FIG. 1, the shutter forms a substantially airtight barrier between the regions H and L, while being positioned such that a large reel of tape 1, typically 27 cms diameter, may fully enter the region H and be placed on the supply hub 16. A hinged opening member 40 is provided across the end of the cover 14 to permit the loading of a supply reel on to the hub without removing the cover. The shutter 15 is also pivotable to a horizontal position, FIG. 2, when it lies above the level of the upper surface of the supply reel 1, and actuator or motor means 17 with a gear coupling 18 are provided for automatically operating the shutter.

The shutter is positioned vertically, i.e. closed, during tape threading, shown in FIG. 1 and positioned horizontally, i.e opened, during normal running, shown in FIG. 2. It will be seen that, during normal running, there is no barrier between the supply and take-up reels, and the reels may be positioned relatively closely since tape spooled on to the take-up reel may enter the space between the supply reel flanges. Prior art automatic threading tape drives have required the centre to centre spacing of the reels to be greater that the supply reel diameter in order to provide space for a fixed barrier between the high and low pressure regions, while the present invention, in using a retractable barrier, permits the centre to centre spacing to be well below the supply reel diameter.

An alternative form of retractable barrier is shown in FIGS. 4 and 5. High and low pressure regions H and L for supply and take-up reels respectively are provided by recesses 19 and 20 in a deck plate 21, and a channel 21 linking the recesses is provided for heads, guides, tensioners and capstans. A retractable barrier is provided by a flexible plastics tape 23 which is wound on a spring loaded capstan 24. The end of the plastics tape may be drawn in a part circular track to form a barrier between the spools by means of a thread 25 joined to a motor 26. Grooves in the upper surface of the deck plate, and in the lower surface of the cover define the track, and the thread may be joined to either the top or bottom of the plastics tape end to run in one or other of the grooves. Energising the motor 26 causes the spooled plastics tape to unwind and form a barrier for tape threading, while de-energising the motor permits the plastic tape to re-spool and the barrier is removed for normal tape running.

A take-up reel 3 having no perforations on the outer surface of its hub member 27 is shown in FIGS. 6 and 8. A lower flange member 28 is provided with a plurality of radially directed slot shaped recesses 31 which lead to a number of elongated through holes 29 lying in an annulus of smaller outside diameter than the diameter of the tape contacting member. A number of screw holes 30 are provided in the land between the holes 29 for attaching the flange member 28 to the hub member 27. A small upper flange member 37 provides additional tape guidance although the flange is not essential in horizontally mounted tape drives. In a tape threading operation, a supply reel is manually loaded through the hinged opening member 40, the entrance being substantially airtight when closed. Remaining operations are then fully automatic, the appropriate motors and actuators being controlled by a programmed microprocessor. In a threading operation, the fan is switched on, the pack following roller is retracted and the pivoted shutter 15 or flexible barrier 23 is closed. The fan causes air to flow from the high pressure region H to the low pressure region L, and air is drawn through the radial recesses 31 and holes 29 into the region Q, below the deck plate, which communicates with the fan inlet, the direction of the airflow being shown by the arrows XX. The deck plate is provided with a circular orifice having a shallow counterbore 32. The take up motor shaft 33 to which an inner hub member 41 is attached, is mounted concentrically with the orifice, and the counterbore is dimensioned to provide just sufficient clearance for free rotation, but negligable air leakage. The supply and take-up motors are then rotated slowly and synchronised such that the linear speed of the take-up hub periphery is substantially equal to the linear speed of the tape as it commences to leave the supply reel hub. Air flow carries the leading end of tape T through the channel and into the vicinity of the take-up hub, as shown in FIG. 1, the lower edge of the tape being drawn into gentle contact with the land between the radially directed recesses 31 of the lower flange and caused to wrap loosely around the hub face. After three or four revolutions, the tape tensioners are caused to operate and the motor speeds are suitably controlled such that the tape is permitted to tension and tightly grip the hub.

When initiating normal tape running, the relevant motors and actuators are energised, the fan is switched off and the pivoted shutter or flexible barrier opened. When the periphery of the pack of spooled tape on the take-up reel extends beyond the flanges 28, 37, the pack following roller 4 is activated to provide guidance as shown in FIG. 2.

It has been found that, when operating a tape drive as described above in an analogue mode using signals of very short wavelength, typically in the order of one micrometer, there was no trace of any tape distortion or associated signal deterioration due to contact with the hub face, such had been found with prior art perforated hubs. When operating at such short wavelengths, however, it has been found that when the hub contact surface is of a metal, for example, aluminium or an aluminium alloy, periodic once per revolution mechanical disturbances may occur due to the step formed by the leading end of tape lying adjacent to the take-up hub peripheral surface, and this effect may penetrate a large number of layers of tape, adversely affecting signal response. This effect has been found to be particularly apparent when a pack following roller having a metallic contact surface is used.

We have found that this form of signal degradation can be largely eliminated by coating the hub face with a thin resilient layer 33, preferably of a polyurenthane elastomer material such as CIL-MONOTHANE (Registered Trade Mark), obtainable from Compounding Ingredients Limited. A further improvement was observed when a similar elastomer coating was applied to the pack following roller contact surface A suitable thickness for such elastomer coatings is in the order of 0.25 to 1.5 mm typically 0.5 mm. The use of an unperforated take-up reel has a second advantage in that the unperforated surface may be readily coated with an elastomer. If a perforated reel were coated with an elastomer material, the perforations would be likely to become covered or partially covered with elastomer, while if the perforations were made after coating the hub surface, they would tend to close due to the resilience of the coating.

A second embodiment of take up reel is shown in FIGS. 9 and 10 in which the lower flange 28 is unaltered, but the hub member 34 has a plurality of elongated through holes 35 between fixing holes 36, these holes aligning with the holes 29 and 30 in the lower flange 28. The lower surface of the upper flange 38 is annularly recessed with, the recessed region 39 overhanging the outer peripheral surface of the hub member and thereby permitting airflow in the direction of the arrows YY when the fan is operating, drawing the upper region of the end of tape towards the upper region of the hub surface, in addition to the airflow XX which largely acts on the lower region of the end of tape.

The invention has been described by way of example, and alternative embodiments will be apparent to those skilled in the art.

We claim:

1. An automatically threading magnetic tape drive comprising a deck plate provided with a top cover and side walls, the deck plate supporting drive means for selectively rotating a supply reel and a take-up reel, the supply reel being positioned in a first air space which, during a threading operation, communicates with a source of relatively high air pressure and the take-up reel being positioned in a second air space which, during a threading operation, communicates with a source of relatively low air pressure, a channel linking the first and second air spaces, and a retractable barrier positioned between the supply and take-up reels, control means being provided to close the barrier during a threading operation such that air flow established between the first and second air spaces through the channel can guide the leading end of magnetic tape from the supply reel through the channel and towards the take-up reel, the control means being operable to open the barrier during normal tape running.

2. A tape drive according to claim 1 wherein the take-up reel is provided with a flange lying to one side of the reel, the flange having a smaller diameter than a pack of spooled tape supported thereon whereby the tape may overhang the flange, the supply reel having a pair of flanges of larger diameter than said flange on said take-up reel and said pack of spooled tape, thereby extending radially outward of a fully spooled pack of tape, the centre to centre spacing of the supply and take-up reels being less than the diameter of the supply reel flanges such that, during normal tape running, an overhanging pack on the take-up reel may cross the opened barrier to freely pass between the flanges of the supply reel.

3. A tape drive according to claim 2 wherein the second air space includes a retractable pack-following roller which is lightly urged towards the overhanging pack during normal tape running.

4. A tape drive according to claim 3 wherein the tape-contacting surface of said roller is formed of a resilient material.

5. A tape drive according to claim 4 wherein said resilient material is a polyurethane elastomer provided in the form of a layer of thickness within the range 0.25 to 1.5 mm.

6. A tape drive according to claim 1 wherein the retractable barrier comprises a pivotable shutter.

7. A tape drive according to claim 1 wherein the retractable barrier comprises a flexible strip which may be drawn across the space between the take-up reel and the supply reel.

8. A tape drive according to claim 7 wherein grooves are provided in facing surfaces of the deck plate and the cover to provide tracks for the edges of the flexible strip.

9. A tape drive according to claim 7 wherein the flexible strip, when retracted, is wound on a spring-loaded capstan, a motor and a thread joining the motor to the leading end of the flexible strip being provided such that when the motor is energised, the flexible strip is drawn across the space between the take-up reel and the supply reel.

10. An automatically threading magnetic tape drive according to claim 1 wherein the take-up reel includes a hub member having an imperforate tape-supporting surface and a side flange extending radially outward of the hub member, the side flange lying closely adjacent to the deck plate, the source of relatively low air pressure being connectable to an orifice in the deck plate beneath the take-up reel, the tape-facing surface of the side flange being provided with a plurality of substantially radially directed slots extending radially inward of the tape-supporting surface of the hub member and leading to a number of orifices in the reel surface facing the deck plate whereby air flow established through the radially directed slots causes the leading end of tape to be drawn into close proximity with the imperforate tape-supporting surface.

11. A tape drive according to claim 10 wherein the take-up reel is provided with a second side flange extending radially outward of the hub member.

12. A tape drive according to claim 11 wherein the tape-facing surface of the second flange is provided with a plurality of radially directed slots extending radially inward of the tape supporting surface of the hub and leading to a plurality of substantially axially directed passages within the hub which communicate with said orifices facing the deck plate.

13. A tape drive according to claim 10 wherein said tape-supporting surface is coated with a resilient layer.

14. A tape drive according to claim 13 wherein said resilient layer comprises a polyurethane elastomer of thickness within the range 0.25 to 1.5 mm.

* * * * *